United States Patent

[11] 3,613,546

[72] Inventor Donald M. Richardson
1751 Old Ranch Road, Los Angeles, Calif. 90049
[21] Appl. No. 855,826
[22] Filed Sept. 8, 1969
[45] Patented Oct. 19, 1971

[54] CAMERA-TRAVERSING STRUCTURE
4 Claims, 5 Drawing Figs.
[52] U.S. Cl. .................................................. 95/86,
352/243, 248/13, 248/14
[51] Int. Cl. .................................................. G03b 17/56
[50] Field of Search .......................................... 248/2, 13,
14, 16; 352/243; 95/86

[56] References Cited
UNITED STATES PATENTS
2,386,276  10/1945  Simjian .................. 95/86

| 2,692,168 | 10/1954 | Gregory | 95/86 X |
| 2,719,471 | 10/1955 | Aspden et al. | 352/243 |
| 2,765,148 | 10/1956 | Prince, Jr. | 248/13 |

Primary Examiner—Samuel S. Matthews
Assistant Examiner—E. M. Bero
Attorney—Spensley, Horn and Lubitz ABSTRACT: A camera-traversing structure for supporting and altering the position of a motion picture or television camera without dependence on the surface conditions of that which a camera dolly or crane is situated upon. A conventional camera dolly or crane having means for vertically and/or radially positioning a motion picture or television camera is utilized. The camera-mounting capability is improved by the inclusion of a curved camera-supporting track permitting the camera to slidably move along the entire length of the track.

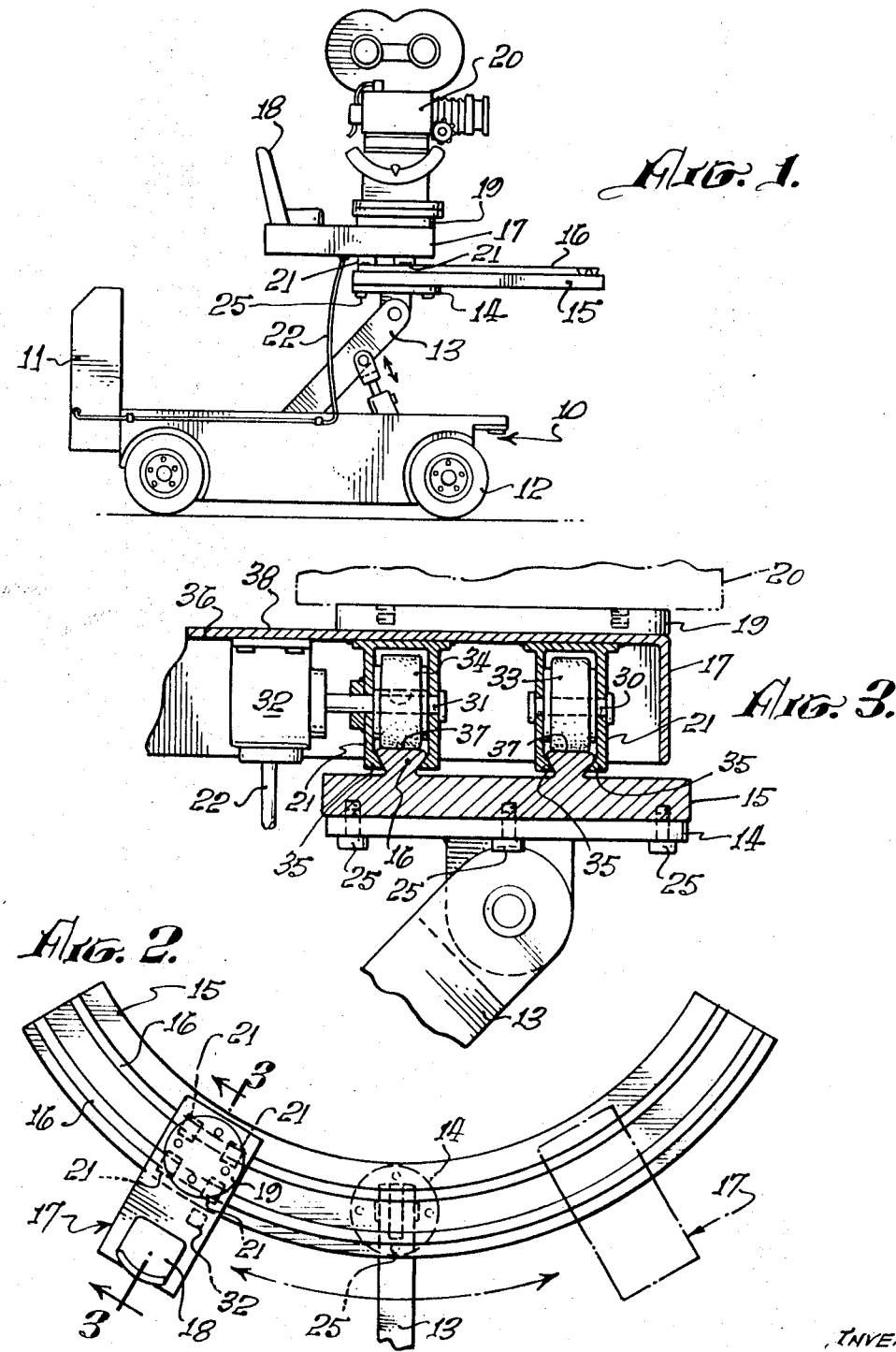

PATENTED OCT 19 1971 3,613,546

INVENTOR.
DONALD M. RICHARDSON,
BY HIS ATTORNEYS
Bensley & Horn.

3,613,546

CAMERA-TRAVERSING STRUCTURE

BACKGROUND OF THE INVENTION

1. Field of the Invention

The present invention camera-traversing structure is related to the field of camera-positioning devices, and more specifically to those devices employed on mobile apparatus.

2. Prior Art

The development and sophistication of the motion picture and television industries has lead to the vast technical improvements being employed today. From the expansion of commercial color television systems to the improvements of the camera equipment itself, the motion picture and television industries have provided means to produce a better product. With all of the equipment and technological improvements which have occurred, the prior art has failed to solve several substantial problems.

In order to produce high-quality film, it has been necessary to insure that any movement of the camera-supporting vehicle while film is being exposed will be uniform and without undulations. Great emphasis had to be placed on the need for flooring or other surface materials which would not jar the vehicle when it was being repositioned laterally or being moved in or out for a closeup or wide-angle shot respectively. Any defect or flaw in the surface of the flooring would be reflected in movement of the camera lens and a total waste of any film exposed. This problem becomes even more acute when the scene being filmed is outdoors where even poor flooring is not available.

The devices disclosed by the prior art have not solved the problem discussed hereinabove. Camera dollys have been provided with vertical hoists and pivots, but this only allows radial movement around a substantially fixed axis. Special cranes known and used within the industry, i.e., titan cranes, have been used to attempt to solve his problem, the device utilizing a moveable extension arm to provide an extra degree of freedom. The titan cranes have not solved this problem because the camera is placed at the end of the extension arm and cannot be provided with the lateral movement required. In addition, the titan crane is quite large and not readily adaptable to close quarters.

The typical method used to solve these basic problems is the placement of substantially uniform tracks on the flooring surface. The tracks provide a smooth surface for the positioning of the camera-supporting vehicles, but this procedure is extremely time consuming, expensive and generally unusable in some situations.

The introduction of the "zoom" lens on the commercial moving-picture cameras has substantially negated the need for camera repositioning on closeup and wide-angle shots. On the other hand, the need for lateral movement leaves the same basic problem unresolved thereby diluting the impact of the zoom lens.

The present invention camera-traversing structure solves the heretofore unresolved problems by providing means to laterally position the moving picture or television camera without requiring any dependence on the flooring surface. The camera mount of a conventional camera dolly or titan crane is cooperatively engaged to a typically curved track member. The camera and seat for a camera can move along the full distance of the track. When the track is slidably engaging the camera mount, the track itself can be repositioned. The capability of smoothly moving the camera negates the presence of any defects or flaws in the flooring or other surface upon which the camera-supporting structure is positioned.

SUMMARY OF THE INVENTION

It is an object of the present invention to provide an apparatus for supporting a motion picture or television camera which permits the smooth repositioning of the camera.

It is another object of the present invention to provide a camera-traversing structure to be used in combination with conventional camera dollys.

It is yet another object of the present invention to provide means for repositioning a motion picture or television camera which does not transfer the presence of surface flaws to the exposed film or monitors respectively.

It is still yet another object of the present invention to provide a camera-traversing structure which negates any dependence upon the condition of the floor surface.

The present invention camera-traversing structure is incorporated with a conventional camera dolly or titan crane. The resulting combination yields an apparatus which permits the repositioning of an active motion picture or television camera without any concern as to the surface conditions upon which the apparatus is located.

The conventional camera dolly has a vertical hoist arm upon which is located a camera mount. The camera mount is adapted by the inclusion of the present invention structure. A track, typically curved, is utilized, the top surface of which is provided with a traversing member. The traversing member will enable complete mobility from one end of the track to the other. The traversing member supports the camera and the cameraman. The control for the traversing member, and therefore the position of the camera are at a control box typically located at the rear of the camera dolly.

The camera can be moved along the full length of the track without any dependence upon the floor or other surface upon which the dolly is located. This feature becomes extremely important when the scene is being photographed on an outdoor location and subsequently there is substantially no possibility to control the conditions of the ground or other surface. Since the camera can be moved along a manufactured track, the uniform surface condition of the track can be maintained to a high degree of accuracy. By providing means to control the surface conditions of the camera-traversing track, lateral and other positioning of the camera can be concurrently executed while a scene is being photographed. Use of the present invention structure eliminates the need for using rails or other devices to compensate for undulating surfaces.

The novel features which are believed to be characteristic of the invention, both as to its organization and to method of operation, together with further objectives and advantages thereof will be better understood from the following description considered in connection with the accompanying drawing of the presently preferred embodiments of the invention illustrated by way of example. It is to be expressly understood, however, that the drawing is for the purpose of illustration and description only, and is not intended as a definition of the limits of the invention.

BRIEF DESCRIPTION OF THE DRAWINGS

FIG. 1 is an elevation view of a motion picture camera mounted on a camera dolly in accordance with the present invention.

FIG. 2 is a top sectional view of the mounted track structure illustrating a transparent member of the present invention.

FIG. 3 is a sectional view of an embodiment of the present invention.

DESCRIPTION OF THE PRESENTLY PREFERRED EMBODIMENT

Figure 4:
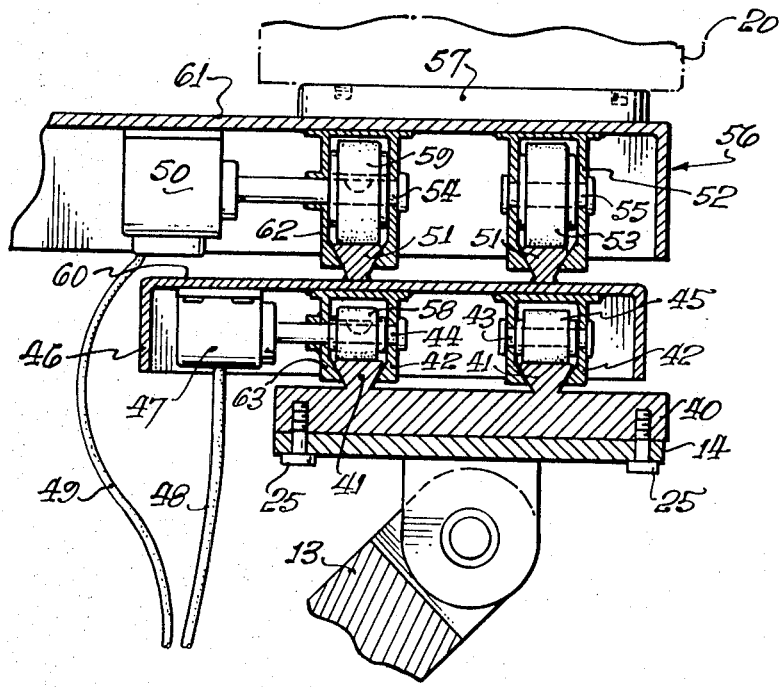
FIG. 4 is a sectional view of an alternative embodiment of the present invention.

A basic understanding of the present invention camera-traversing structure can be best achieved by reference to FIG. 1. A camera dolly 10 is shown in FIG. 1, the camera dolly 10 being adapted to be mobile upon the wheels 12. The camera dolly 10 is provided with a vertical hoist arm 13 upon which is mounted a conventional camera-mounting bracket 14, the top surface of which remains substantially horizontal irrespective of the vertical position of the hoist arm 13. The camera dolly 10 has a power source such as batteries which it typically carries in the area of the control box 11. The power source is used to provide motive power to the present invention camera-traversing structure. The camera dolly 10 is a conventional, known vehicle and not a part of the present invention, the camera dolly 10 being used for the purpose of description and example only. The present invention camera-traversing structure could be used in combination with a conventional camera crane such as one commonly known in the industry as a titan crane.

A motion picture camera 20 is secured to the camera mount 19. The use of a motion picture camera 20 is for the purpose of description and example only. The present invention camera-traversing structure could utilize a conventional television camera or other like device. The camera 20 can be equipped with a conventional lens system or a zoom lens, the specific optical system not being part of the present invention. The camera mount 19 and a cameraman's seat 18 are secured to the camera platform 17 in cooperative registration with one another. A track base 15 is securely mounted upon the conventional camera mount 14 of the camera dolly 10. The track base 15 shown in FIG. 1 utilizes a pair of rails 16 to guide the movement of the camera platform 17 and the camera thereon. The camera platform 17 slidably engages the side surfaces of the rails 16 via the rail followers 21 which allow movement along the rails 16 but which will secure the camera platform to the rails 16.

The allowable movement of the camera platform 17 can be best seen by reference to FIG. 2. The track base 15 is shown mounted to the camera mount 14 by conventional threaded bolts 25. The track base 15 shown in FIG. 2 is a portion of a typically curved surface, the rails 16 being spaced for stability and substantially following the curvature of the track base 15. The use of a curved track is one of choice. The track base 15 can be any form which will permit uniform movement along the rails 16 or other conventional means to guide the camera platform 17 along the track base 15. The number of rails 16 could be changed, the use of two rails 16 being form the purpose of example only. Referring again to FIG. 1, the camera platform 17 can be moved along the rails 16 in a manner which would provide lateral movement of the camera 20. Since conventional mechanical machining of the track base 15 and the associated rails 16 can easily produce a highly uniform surface on the rails 16, the camera platform 17 can be positioned without jarring the camera and therefore without ruining or otherwise adversely affecting the exposed film. The present invention camera-traversing structure provides the capability to laterally position a camera 20 without any dependence on the surface of the flooring or other site upon which the camera dolly 10 is disposed. The camera 20 can be moved along the rails 16 while film is being concurrently exposed substantially without visible deflection. When the present invention camera-traversing structure is utilized in combination with a camera equipped with a "zoom" lens, a scene can be filmed from various lateral angles and apparently various distances without the need to ever physically reposition the camera dolly 10. A sectional view of a preferred embodiment of the present invention camera-traversing structure is illustrated in FIG. 3. The vertical hoist arm 13 and associated camera mount 14 of the conventional camera dolly 10 are position to receive the present invention camera-traversing structure, the track base 15 being secured to the camera mount 14 by conventional bolts 25. The track base 15 shown in FIG. 3 has a pair of rails 16 in parallel relation to one another. The rails 16 can be separate entities from the rack base 15 or be projections thereof, the manner of producing the illustrated configuration not being a part of the present invention. The rails 16 are projected upwardly from the surface of the track base 15, the cross-sectional distance of the upper portion of the rail 16 being substantially larger than the lower portion substantially adjacent the track base 15. Substantially larger shall mean at least twice as large.

The camera platform 17 cooperatively engages the rails 16 via the rail followers 21. The rail followers 21 depend downwardly from the bottom surface 36 of the camera platform 17. The end portion of the rail followers 21 extend into flanges 35. The flanges 35 of each rail follower 21 are adapted to slidably engage the side surfaces of the rails 16 to prevent the camera platform 17 from being inadvertently disengaged from the rails 16. The upper surface of the rails 16 are disposed between the two sections of the rail followers 21. Rollers 33 and 34 rollingly engage the surface 37 of the rails 16. The rollers 33 and 34 are made of conventional materials which will enable a frictional as well as a rolling engagement between the rollers 33 and 34 and rails 16, the rollers 33 and 34 typically being hard rubber. The rollers 33 and 34 are mounted between the two sections of the rail followers 21 via the axles 30 and 31 respectively. Axle 30 is disposed through and affixed to the two sections of the respective rail follower 21, the roller 33 rotatably coupled about the axle 30. Axle 31 is disposed through and rotatably engages the two sections of the rail follower 21, the roller 34 being affixed to the axle 31. Axle 31 is powered by the bidirectional motors 32. The camera mount 19 is disposed upon and secured to the top surface 38 of the camera platform 17.

The rollers 33 and 34 provide a supporting force for the camera platform 17 and the equipment utilized therewith. The rollers 33 and 34 will support the weight of the camera platform 17 while the rail followers 21 maintain the stability of the structure. Referring again to FIG. 2, the transparent view of the disposed camera platform 17 illustrates a typical placement of the rail followers 21. The track base 15 being a curved member will necessitate the use of several separate rail followers 21 per track or a single follower per track which will emulate the curvature of the rails 16. The first alternative is used and shown in FIG. 2.

The bidirectional motors 32 will provide for the bidirectional control of the axle 31. Bidirectional rotation enables the camera platform 17 to be positioned at any location along the track base 15. Control and power for the bidirectional motors 32 is via the cable 22. The control for the bidirectional motors 32 is typically established at the control box 11 at the rear of the camera dolly 10. Pursuant to specific instructions established prior to filming, an operator situated at the control box 11 shall position the camera platform 17 at any location along the track base 15 while the scene is being photographed.

The interface between the rollers 33 and 34 and the rails 16 will provide a surface upon which the camera platform 17 can be smoothly moved. Since it is the camera platform 17 which is being positioned and not the camera dolly 10, there is no way any defects in the flooring of the filming site can affect the quality of the exposed film.

An alternative embodiment of the present invention camera-traversing structure is illustrated in FIG. 4. The alternative embodiment of the present invention shown in FIG. 4 provides for positioning a camera platform as in the case described with respect to FIG. 1, FIG. 2 and FIG. 3. In addition, the alternative embodiment provides for positioning of a track base itself. The alternative embodiment of the present invention camera-traversing structure expands the field of movement for a motion picture or television camera.

Referring now to FIG. 4, the vertical hoist arm 13 and camera mount 14 of the conventional camera dolly 10 are shown in combination with the alternative embodiment of the present invention camera-traversing structure. The first track base 40 is mounted upon the dolly camera mount 14 by the conventional bolts 25. The track base 40 utilizes a pair of rails 41 for guidance. The rails 41 are in parallel spaced relation for stability. The rails 41 project vertically upward providing means for slidable engagement of the rails 41 by the rail followers 42 and 63. The track base 40 is typically a curved arc providing a uniform curvature, the geometrical form used being discretionary subject to the conditions set forth hereinabove. The use of two rails 41 is for stability purposes only, the number and specific designation of a guidance means is not intended as a limitation of the present invention.

The rollers 45 and 58 are mounted within the rail followers 42 and 63 by the fixed axle 43 and rotatable axle 44 respectively. The rollers 45 rollingly engage the rails 41, and in addition are adapted to frictionally engage the surface of the rails 41. The rollers 45 and 58 are typically made of hard rubber. The roller 45 freely rotates about the fixed axle 43, the fixed axle 43 being securely disposed through and affixed to its respective rail follower 42. The roller 58 is securely affixed to the axle 44, the axle 44 being disposed through and rotatably engaging its respective rail follower 63. The rollers 45 and 58 typically have a lower profile than the rollers 53 and 59, the low profile to reduce the overall height of the combination of the camera-supporting vehicle and present invention structure. The rotatable axle 44 is coupled to the bidirectional motor 47, the bidirectional motor 47 being controlled and powered via the cable 48. The rail followers 42 and 63 depend downwardly from the bottom surface 60 of the second track base 46.

The second track base 46 serves as a covering structure for the roller and guidance members described herein above as well as for the track base for the camera platform 56. Rails 51 project upwardly from the track base 46 providing an upper portion which has a cross section substantially larger than the lower portion thereof adjacent the track base 46. Substantially larger shall mean at least twice as large. As stated hereinabove, the number of rails 51 and configuration illustrated as guidance means are for the purpose of example only and not intended to limit the present invention. The camera platform 56 has depending from the lower surface 61 thereof the pair of rail followers 52 and 62. The rail followers slidably engage the side surfaces of the rails 51 securing the camera platform 56 to the rails 51. In a manner similar to that described with respect to FIG. 2, the rail followers 52 and 62 can be unitary or multiple elements depending on the geometrical form of the track base 46. The rollers 52 and 59 support the camera platform 56 upon the rails 51, the rollers 53 and 59 rollingly and frictionally engaging the top surface of the rails 51. As described hereinabove, the rollers 53 and 59 will typically be made of a hard rubber. The roller 53 is rotatably coupled to the axle 55, the axle 55 being conventionally disposed through and fixedly secured to the two sections of the respective rail follower 52. The roller 59 is secured to the rotatable axle 54 conventionally coupled to rotate in an axle mounting disposed within the two sections of the respective rail follower 62. The axle 54 is powered by the bidirectional motors 50 which in turn are controlled via the cable 49. The camera mount 57 is affixed to the top surface of the camera platform 56 for mounting a motion picture or television camera.

The alternative embodiment of the present invention camera-traversing structure provides two degrees of freedom. The camera secured to the camera mount 57 can be positioned along the track base 56 by activation of the bidirectional motors 50. In addition, the track base 46 can itself be positioned relative to the dolly camera mount 14 by activation of the bidirectional control motors 47.

The operation of the alternative embodiment of the present invention camera-traversing structure will be based on the need to reposition the mounted camera. By activating the bidirectional 50 and/or 47, the camera platform 56 and/or the track base 46 can be slidably positioned along the respective rails 51 or 41. The rollers 58 and 59 will provide the motive power with the rail followers 42, 52, 62 and 63 enabling the camera and associated equipment to be moved with safety.

Figure 5:
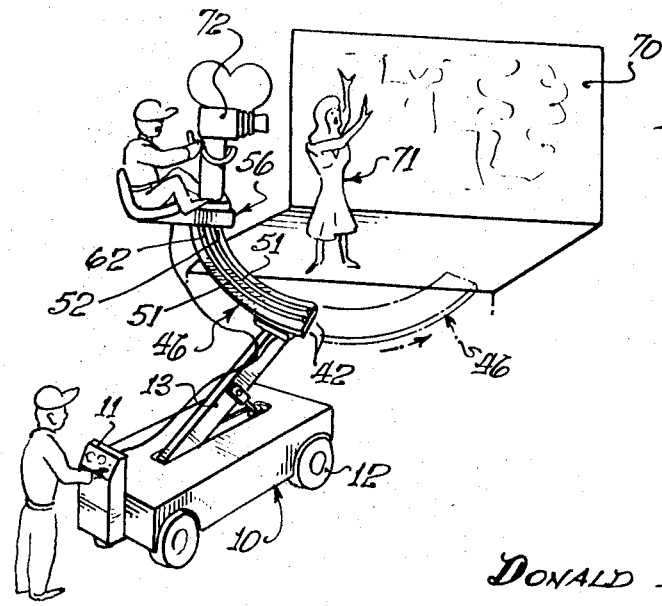
FIG. 5 is a perspective view of a camera used in accordance with the present invention.

The contemplated use of the alternative embodiment of the present invention camera-traversing structure can be best understood by reference to FIG. 5. A camera dolly 10 is shown with the present invention camera-traversing structure mounted thereon. As discussed, the results of laterally positioning a camera using means disclosed by the prior art are costly and time consuming. The scene shown in FIG. 5 represents a typical scene 70 and the subject 71. The camera platform 56 and camera 72 are to be moved along the rails 51 of the track base 46 with the track base 46 itself being moved relative to the vertical hoist arm 13. By employing someone to control the movement of the track base 46 and camera platform 56, the cameraman will have a large potential field of vision coupled with independence from surface flaws. The camera 72 and/or the track base 46 can be moved without any concern for flooring conditions since the camera dolly 10 remains stationary.

The use of the present invention camera-traversing structure will result in savings of time and money since a source of waste is eliminated. The present invention camera-traversing structure eliminates any concern over the surface conditions of the floor of a sound studio or other filming location since the camera dolly 10 need not be moved while a scene is being photographed. The uniform movement of the camera is via the interface of the respective rails and rollers, therefore the camera is segregated from any derogating conditions. Exposed film will not be subject to visible jarring as a result of surface flaws since the surface flaws will no longer be a material consideration.

The embodiments of the present invention structure illustrated in FIGS. 1-5 have the guidance means mounted upon the respective track base with the motive power and securing followers traversing over the guidance means. After of review of the above discussion, it would be obvious to one with skill in the art that the placement of the guide means and the motive power and securing followers could be reversed. The reversed configuration would be equally as effective as the embodiments illustrated in FIGS. 1-5.

I claim:

1. In combination with a camera-supporting vehicle of the type having a conventional camera hoist and mount for providing support to a commercial motion picture or television camera, an improvement comprising:
    a. a first track base coupled to the vehicle camera mount;
    b. first rails projecting upwardly from said first track base, said first rails having a top and side surfaces thereto;
    c. a second track base having a top and bottom surface thereof, said second track base being substantially the same shape as said first track base;
    d. first rail followers depending downwardly from the bottom surface from said second track base, said first rail followers cooperatively engaging the side surfaces of said first rail;
    e. first rollers rotatably coupled to said first rail followers and cooperatively engaging the top surface of first rails;
    f. first motor means for providing bidirectional rotation to said first rollers;
    g. second rails projecting upwardly from said second track base, said second rails having top and side surfaces;
    h. a camera platform having a top and bottom surface thereof, said camera platform adapted to support the camera on the top surface thereof;
    i. second rail followers depending downwardly from the bottom surface of said camera platform and cooperatively engaging the side surfaces of said second rails;
    j. second rollers rotatably coupled to said second rail followers and cooperatively engaging the top surface of said second rails; and
    k. second motor means for providing bidirectional rotation to said second rollers.

2. A combination as in claim 1 wherein said first and second rail followers slidably engage the side surfaces of said first and second rails respectively.

3. A combination as in claim 1 wherein the top surface of said first and second rails is substantially uniform.

4. A combination as in claim 3 wherein said first and second rollers frictionally engage the top surface of said first and second rails respectively.